(12) United States Patent
    Li

(10) Patent No.: US 10,203,439 B2
(45) Date of Patent: Feb. 12, 2019

(54) DOUBLE-SIDE LIQUID CRYSTAL DISPLAY DEVICE AND BACKLIGHT MODULE THEREOF

(71) Applicant: Shenzhen China Star Optoelectronics Technology Co., Ltd., Shenzhen, Guangdong (CN)

(72) Inventor: Minghui Li, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 241 days.

(21) Appl. No.: 15/107,449

(22) PCT Filed: May 10, 2016

(86) PCT No.: PCT/CN2016/081507
    § 371 (c)(1),
    (2) Date: Jun. 22, 2016

(87) PCT Pub. No.: WO2017/177488
    PCT Pub. Date: Oct. 19, 2017

(65) Prior Publication Data
    US 2018/0156953 A1    Jun. 7, 2018

(30) Foreign Application Priority Data
    Apr. 13, 2016  (CN) .......................... 2016 1 0228493

(51) Int. Cl.
    *G02F 1/133*    (2006.01)
    *G02B 5/30*     (2006.01)
    (Continued)

(52) U.S. Cl.
    CPC ............. *G02B 5/30* (2013.01); *G02B 5/3058* (2013.01); *G02F 1/13362* (2013.01);
    (Continued)

(58) Field of Classification Search
    CPC ............. G02F 1/1347; G02F 1/133603; G02F 1/133528; G02F 1/133514;
    (Continued)

(56) References Cited

U.S. PATENT DOCUMENTS

2006/0244880 A1* 11/2006 Onishi .............. G02F 1/133615
                                                    349/74
2008/0204874 A1   8/2008 Kim et al.
(Continued)

FOREIGN PATENT DOCUMENTS

| CN | 102566141 A | 7/2012 |
| CN | 203299494 U | 11/2013 |
| CN | 103901664 A | 7/2014 |

*Primary Examiner* — Charles Chang
(74) *Attorney, Agent, or Firm* — Andrew C. Cheng

(57) ABSTRACT

The disclosure discloses a double-side liquid crystal display device and a backlight module thereof, the two metal wire grating polarized films with perpendicular metal wire gratings can utilize reflective light of the liquid crystal panel on one side to provide incidence light to the liquid crystal panel on the other side, the incidence light and the reflective light of the two liquid crystal panels compensate mutually to improve light utilization efficiency significantly and brightness of the two liquid crystal panels, and brightness of the two is unified simultaneously; moreover, the built-in metal wire grating polarized film substitutes the polarized plate attached on outside of the substrate, which can reduce processes and costs without sacrificing characteristics of polarized light; white backlight is formed by the blue LED, the red and green quantum dots to increase color gamut and brightness of the double-side display device.

10 Claims, 1 Drawing Sheet

(51) Int. Cl.
*G02F 1/1335* (2006.01)
*G02F 1/1333* (2006.01)
*G02B 5/02* (2006.01)

(52) U.S. Cl.
CPC .. *G02F 1/133504* (2013.01); *G02F 1/133536* (2013.01); *G02F 1/133615* (2013.01); *G02F 1/133621* (2013.01); *G02B 5/0278* (2013.01); *G02F 2001/133342* (2013.01); *G02F 2001/133567* (2013.01); *G02F 2001/133607* (2013.01); *G02F 2001/133614* (2013.01); *G02F 2201/30* (2013.01)

(58) Field of Classification Search
CPC ......... G02F 1/133504; G02F 1/133536; G02F 1/133615; G02F 1/13362; G02F 1/133621; G02F 2001/133342; G02F 2001/133567; G02F 2001/133607; G02F 2001/133614; G02F 2201/30; G02B 5/30; G02B 5/0278; G02B 5/3058
USPC .......................................................... 349/74
See application file for complete search history.

(56) References Cited

U.S. PATENT DOCUMENTS

| | | |
|---|---|---|
| 2013/0300986 A1 | 11/2013 | Kang |
| 2014/0334181 A1 | 11/2014 | Hu et al. |
| 2015/0062500 A1 | 3/2015 | Park et al. |
| 2016/0062183 A1* | 3/2016 | Sung ................. G02F 1/133514 349/71 |

* cited by examiner

DOUBLE-SIDE LIQUID CRYSTAL DISPLAY DEVICE AND BACKLIGHT MODULE THEREOF

FIELD OF THE DISCLOSURE

The disclosure relates to a liquid crystal display (LCD) technical field, and more particularly to a double-side liquid crystal display device and a backlight module thereof.

BACKGROUND OF THE DISCLOSURE

A double-side liquid crystal display device has been applied in a trading place such as a bank or a market due to a requirement of confirming a display on two opposite screens. In structure design of a double-side liquid crystal display device, two opposite liquid crystal panels share one set of backlight modules, according to a position relation between backlight and a light guide plate, the backlight modules are divided into two types—an edge-lighting type and a bottom-lighting type, the edge lighting type backlight module is widely applied due to benefits such as thinness.

Light provided by the backlight forms surface light after penetrating the light guide plate and becomes polarized light required by the liquid crystal panel after going through polarized sheets, the polarized sheets are attached to top and bottom sides of the liquid crystal panel respectively, which can increase costs of the attachment, and the polarized sheet consists of a polyvinyl alcohol (PVA) layer, a tri-cellulose acetate (TAC) layer and a polyethylene terephthalate (PET) film, whose structure is complicated, leading to a poor performance in light utilization of the polarized sheet. Moreover, the amount of light of a reflective surface and that of a light-emitting surface of the light guide plate are different, which make high brightness in the liquid crystal panel on a side of the light-emitting surface, and low brightness in the liquid crystal panel on a side of the reflective surface, brightness of the two liquid crystal panels corresponding to one backlight will be different, light utilization efficiency is low.

SUMMARY OF THE DISCLOSURE

Therefore, the disclosure provides a double-side liquid crystal display device and a backlight module thereof, in order to improve light utilization efficiency and brightness of two liquid crystal panels, and unify brightness of the two.

A double-side liquid crystal display device provided by the embodiment of the disclosure includes: a light guide plate containing at least a light incidence surface, a first light-emitting surface and a second light-emitting surface connected to the at least one light incidence surface respectively and disposed opposite; a light source, disposed adjacently to the light incidence surface, the light source includes a blue LED, red light quantum dots and green light quantum dots, light from the blue LED, the red light quantum dots and the green light quantum dots are blended to form white light; a first liquid crystal panel, disposed adjacently to the first light-emitting surface, a first metal wire grating polarized film of the first liquid crystal panel is adjacent to the first light-emitting surface; a second liquid crystal panel, disposed adjacently to the second light-emitting surface, a second metal wire grating polarized film of the second liquid crystal panel is adjacent to the second light-emitting surface; a first diffusion plate and a second diffusion plate, the first diffusion plate is disposed between the light guide plate and the first metal wire grating polarized film, the second diffusion plate is disposed between the light guide plate and the second metal wire grating polarized film; a direction of a metal wire grating of the first metal wire grating polarized film is perpendicular to that of the second metal wire grating polarized film.

The red light quantum dots and the green light quantum dots are dispersed in a first quantum dot film and a second quantum dot film, the first quantum dot film and the second quantum dot film are disposed between the blue LED and the light incidence surface of the light guide plate or disposed on the first light-emitting surface and second light-emitting surface of the light guide plate.

The red light quantum dots and the green light quantum dots are dispersed in one quantum dot film, the quantum dot film is disposed between the blue LED and the light incidence surface of the light guide plate or disposed on the first light-emitting surface and second light-emitting surface of the light guide plate.

The first liquid crystal panel and the second liquid crystal panel each include a first substrate, a second substrate and a liquid crystal layer disposed between the first substrate and the second substrate, at least one of the first metal wire grating polarized film and the second metal wire grating polarized film is disposed between the first substrate and the second substrate, adjacently to a side of the liquid crystal layer towards the light guide plate.

A double-side liquid crystal display device provided by the embodiment of the disclosure includes: a light guide plate, containing at least a light incidence surface, a first light-emitting surface and a second light-emitting surface connected to the at least one light incidence surface respectively and disposed opposite; a light source, disposed adjacently to the light incidence surface; a first liquid crystal panel, disposed adjacently to the first light-emitting surface, a first metal wire grating polarized film of the first liquid crystal panel is adjacent to the first light-emitting surface; a second liquid crystal panel, disposed adjacently to the second light-emitting surface, a second metal wire grating polarized film of the second liquid crystal panel is adjacent to the second light-emitting surface; a direction of a metal wire grating of the first metal wire grating polarized film is perpendicular to that of the second metal wire grating polarized film.

The light source includes a blue LED, red light quantum dots and green light quantum dots, light from the blue LED, the red light quantum dots and the green light quantum dots are blended to form white light.

The red light quantum dots and the green light quantum dots are dispersed in a first quantum dot film and a second quantum dot film, the first quantum dot film and the second quantum dot film are disposed between the blue LED and the light incidence surface of the light guide plate or disposed on the first light-emitting surface and second light-emitting surface of the light guide plate.

The red light quantum dots and the green light quantum dots are dispersed in one quantum dot film, the quantum dot film is disposed between the blue LED and the light incidence surface of the light guide plate or disposed on the first light-emitting surface and second light-emitting surface of the light guide plate.

The first liquid crystal panel and the second liquid crystal panel each include a first substrate, a second substrate and a liquid crystal layer disposed between the first substrate and the second substrate, at least one of the first metal wire grating polarized film and the second metal wire grating polarized film is disposed between the first substrate and the second substrate, adjacently to a side of the liquid crystal layer towards the light guide plate.

The double-side liquid crystal display device further includes a first diffusion plate and a second diffusion plate, the first diffusion plate is disposed between the light guide plate and the first metal wire grating polarized film, the second diffusion plate is disposed between the light guide plate and the second metal wire grating polarized film.

The embodiment of the disclosure provides a backlight module applied in a double-side liquid crystal display device, including: a light guide plate, containing at least a light incidence surface, a first light-emitting surface and a second light-emitting surface connected to the at least one light incidence surface respectively and disposed opposite; a light source, disposed adjacently to the light incidence surface; a first metal wire grating polarized film, disposed adjacently to the first light-emitting surface; a second metal wire grating polarized film, disposed adjacently to the second light-emitting surface.

The light source includes a blue LED, red light quantum dots and green light quantum dots, light from the blue LED, the red light quantum dots and the green light quantum dots are blended to form white light.

The red light quantum dots and the green light quantum dots are dispersed in one quantum dot film, the quantum dot film is disposed between the blue LED and the light incidence surface of the light guide plate or disposed on the first light-emitting surface and second light-emitting surface of the light guide plate.

The backlight module further includes a first diffusion plate and a second diffusion plate, the first diffusion plate is disposed between the light guide plate and the first metal wire grating polarized film, the second diffusion plate is disposed between the light guide plate and the second metal wire grating polarized film.

According to the double-side liquid crystal display device and the backlight module thereof of the embodiments of the disclosure, the two metal wire grating polarized films with perpendicular metal wire gratings can utilize reflective light of the liquid crystal panel on one side to provide incidence light to the liquid crystal panel on the other side, the incidence light and the reflective light of the two liquid crystal panels of the double-side display device compensate mutually to fully utilize light from the light source, which can improve light utilization efficiency significantly and brightness of the two liquid crystal panels, and unify brightness of the two.

DETAILED DESCRIPTION OF PREFERRED EMBODIMENTS

Embodiments of the disclosure are described in detail with reference to the accompanying drawings as follows.

Figure 1:
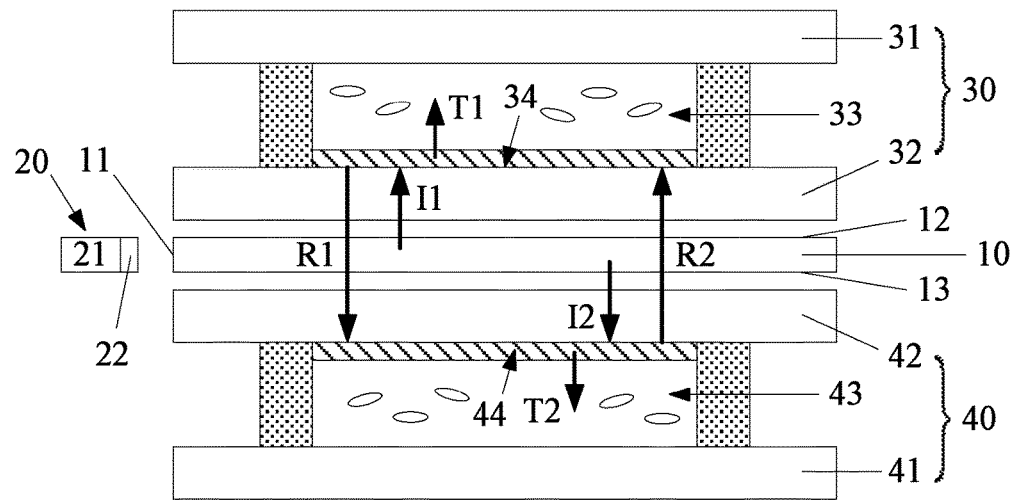
FIG. 1 is a structural cross-sectional view of a double-side liquid crystal display device according to an embodiment the disclosure.

FIG. 1 is a structural cross-sectional view of a double-side liquid crystal display device according to an embodiment the disclosure. Referring to FIG. 1, the double-side liquid crystal display device of the embodiment includes a light guide plate 10, a light source 20, a first liquid crystal panel 30 and a second liquid crystal panel 40.

The light guide plate 10 includes a light incidence surface 11, a first light-emitting surface 12 and a second light-emitting surface 13 connected to the light incidence surface 11 respectively and disposed opposite. The first light-emitting surface 12 is an upper surface of the light guide plate 10, the second light-emitting surface 13 is a lower surface of the light guide plate 10, the light incidence surface 11 is a lateral surface connecting the upper surface and the lower surface. It is comprehensible that the light guide plate 10 can further include two light incidence surfaces 11, which means the other light incidence surface is a lateral surface corresponding to the light incidence surface 11 shown in FIG. 1.

The light source 20 is disposed adjacently to the light incidence surface 11, preferably, the light source 20 of the embodiment includes a blue LED 21 and at least a quantum dot film 22, red light quantum dots and green light quantum dots are dispersed in the at least one quantum dot film 22, the red light quantum dots and the green light quantum dots can be dispersed in the same quantum dot film 22, or dispersed in two quantum dot films 22, that is, the red light quantum dots are dispersed in a first quantum dot film and the green light quantum dots are dispersed in a second quantum dot film.

The quantum dot film 22 shown in FIG. 1 is taken as an example, blue light from the blue LED 21 passes through the quantum dot film 22 and the light guide plate 10, the red light quantum dots and the green light quantum dots dispersed in the quantum dot film 22 absorb partial blue light, then the red light quantum dots emit red light, the green light quantum dots emit green light, remaining blue light, the red light from the red light quantum dots and the green light from the green light quantum dots are blended to form white light. The red light quantum dots dispersed in the quantum dot film 22 have discrete electronic energy levels, the green light quantum dots have discrete electronic energy levels as well, when the red light and the green light quantum dots are irradiated, electrons on valence bands and conduction bands transit back and forth so that light is emitted.

Accordingly, in structural design of the light source 20 of the embodiment, the blue LED 21 and the quantum dot film 22 are two separate sections, and the red light from the red light quantum dots is highly pure red monochromatic light, the green light from the green light quantum dots is highly pure green monochromatic light, so that wide color gamut can be achieved, the red light and the green light from the quantum dot film 22 will not be influenced by heat generated by the blue LED 21 in operation, preventing color impurity.

In the embodiment, white light is formed by merely disposing the quantum dot film 22 on an optical path of the blue LED 21, specifically, the quantum dot film 22 (including a first quantum dot film and a second quantum dot film) can be disposed between the blue LED 21 and the light incidence surface 11 of the light guide plate 10, or disposed on the first light-emitting surface 12 and second light-emitting surface 13 of the light guide plate 11.

The first liquid crystal panel 30 is disposed adjacently to the first light-emitting surface 12 of the light guide plate 10, the second liquid crystal panel 40 is disposed adjacently to the second light-emitting surface 13 of the light guide plate 10. Structures of the first liquid crystal panel 30 and the second liquid crystal panel 40 can be identical, the first liquid crystal panel 30, for example, includes a first substrate 31 and a second substrate 32 that are separate and opposite, one of the first substrate 31 and the second substrate 32 is a color filter (CF) substrate, the other one of the first substrate 31 and the second substrate 32 is a thin film transistor (TFT) substrate, or an array substrate, and a liquid crystal layer 33 filled between the two substrates, the liquid crystal layer 33 includes liquid crystal molecules, disposed in a liquid crystal cell formed by overlapping the array substrate and the color filter substrate.

Based on the structure above, the first liquid crystal panel 30 of the embodiment further includes a built-in first metal wire grating polarized film 34, the first metal wire grating polarized film 34 is disposed between the array substrate and the color film substrate of the first liquid crystal panel 30, the first metal wire grating polarized film 34 is disposed between the first light-emitting surface 12 of the light guide plate 10 and the liquid crystal layer 33, adjacently to a side of the liquid crystal layer 33 towards the light guide plate 10 specifically, as shown in FIG. 1, the first metal wire grating polarized film 34 is disposed on an upper surface of the second substrate 32 shown in FIG. 1. Similarly, the second liquid crystal panel 40 includes a built-in second metal wire grating polarized film 44, the second metal wire grating polarized film 44 is disposed between a first substrate 41 and a second substrate 42 of the second liquid crystal panel 40, the second metal wire grating polarized film 44 is disposed between the second light-emitting surface 13 of the light guide plate 10 and a liquid crystal layer 43, adjacently to a side of the liquid crystal layer 43 towards the light guide plate 10 specifically, as shown in FIG. 1, the second metal wire grating polarized film 44 is disposed on an inner surface of the second substrate 42 shown in FIG. 1.

A metal wire grating of the first metal wire grating polarized film 34 can be formed on a glass substrate of the second substrate 32 of the first liquid crystal panel 30 directly, the first metal wire grating polarized film 34 and the first liquid crystal panel 30 share the glass substrate. Similarly, a metal wire grating of the second metal wire grating polarized film 44 can be formed on a glass substrate of the second substrate 42 of the second liquid crystal panel 40 directly, the second metal wire grating polarized film 44 and the second liquid crystal panel 40 share the glass substrate.

Figure 2:
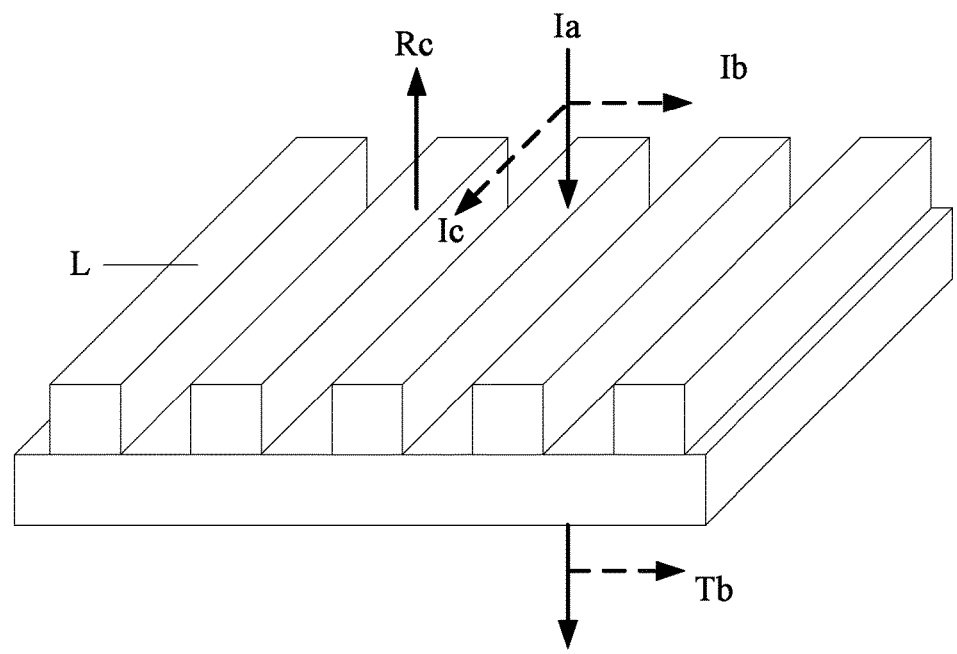
FIG. 2 is a schematic structural view of a metal wire grating polarized film according to an embodiment the disclosure.

In the embodiment of the disclosure, a direction of the metal wire grating of the first metal wire grating polarized film 34 is perpendicular to that of the second metal wire grating polarized film 44. Referring to a schematic structural view of a metal wire grating polarized film according to an embodiment shown in FIG. 2, light perpendicular to a metal wire grating L can penetrate the metal wire grating polarized film, and light parallel to the metal wire grating L is reflected. For instance, Ia is incidence light, Ib and Ic are a vertical component and a parallel component of Ia, so Ib can penetrate the metal wire grating to be polarized light Tb, and the incidence light Ic can only be reflected to be reflective light Rc.

Further combining with FIG. 1, white light formed by the light source 20 is incident on the light guide plate 10 through the light incidence surface 11, the light guide plate 10 turns the light source 20 into surface light, light from the first light-emitting surface 12 is incidence light I1 entering the first liquid crystal panel 30, light from the second light-emitting surface 13 is incidence light I2 entering the second liquid crystal panel 40.

In the first liquid crystal panel 30, when the incidence light I1 enters the first metal wire grating polarized film 34, light perpendicular to the metal wire grating becomes polarized light T1 and penetrates the first liquid crystal panel 30, and light parallel to the metal wire grating is reflected to be reflective light R1. The reflective light R1 reforms to be surface light after penetrating the light guide plate 10 of second liquid crystal panel 40, light perpendicular to the metal wire grating of the second metal wire grating polarized film 44 becomes polarized light and penetrates the second liquid crystal panel 40, and light parallel to the metal wire grating of the second metal wire grating polarized film 44 is reflected, to be incidence light of the first liquid crystal panel 30 after re-penetrating the light guide plate 10.

Similarly, in the second liquid crystal panel 40, when the incidence light I2 enters the second metal wire grating polarized film 44, light perpendicular to the metal wire grating becomes polarized light T2 and penetrates the second liquid crystal panel 40, and light parallel to the metal wire grating is reflected to be reflective light R2. The reflective light R2 reforms to be surface light after penetrating the light guide plate 10 of first liquid crystal panel 30, light perpendicular to the metal wire grating of the first metal wire grating polarized film 34 becomes polarized light and penetrates the first liquid crystal panel 30, and light parallel to the metal wire grating of the first metal wire grating polarized film 34 is reflected, to be incidence light of the second liquid crystal panel 40 after re-penetrating the light guide plate 10.

After several loops, the white light from the light source 20 can be fully utilized by the double-side display device, incidence light and reflective light of the two liquid crystal panels 30, 40 of the double-side display device compensate mutually, which make light from the light source 20 to be utilized thoroughly and improve light utilization efficiency significantly, and brightness of the two liquid crystal panels 30, 40 is increased, and brightness of the two is unified simultaneously.

The double-side liquid crystal display device of the embodiment of the disclosure further includes a first diffusion plate and a second diffusion plate, the first diffusion plate is disposed between the light guide plate 10 and the first metal wire grating polarized film 34, the second diffusion plate is disposed between the light guide plate 10 and the second metal wire grating polarized film 44. Specifically, the first diffusion plate can be attached on an outer surface of the second substrate 32 of the first liquid crystal panel 30, applied to further scatter the light from the light guide plate 10, making light radiating to the first liquid crystal panel 30 to be more even; the second diffusion plate can be attached on an outer surface of the second substrate 42 of the second liquid crystal panel 40, applied to further scatter the light from the light guide plate 10, making light radiating to the second liquid crystal panel 40 to be more even.

In the embodiment shown in FIG. 1, a backlight module shared by the first liquid crystal panel 30 and the second liquid crystal panel 40 includes the light guide plate 10 and the light source 20, preferably further including the first diffusion plate and the second diffusion plate. The disclosure further provides a backlight module of the embodiment, the backlight module of the embodiment not only includes the light guide plate 10 and the light source 20 above, obviously the first diffusion plate and the second diffusion plate included as a preference as well, but also including the first metal wire grating polarized film 34 and the second metal wire grating polarized film 44, the first metal wire grating polarized film 34 is disposed adjacently to the first light incidence surface 12 of the light guide plate 10, the second metal wire grating polarized film 44 is disposed adjacently to the second light incidence surface 13 of the light guide plate 10. Equally, the first metal wire grating polarized film 34 and the second metal wire grating polarized film 44 can also be attached on two sides of the light guide plate 10 shown in FIG. 1 of the disclosure.

In summary, according to the embodiments, the two metal wire grating polarized films with perpendicular metal wire gratings can utilize reflective light of the liquid crystal panel on one side to provide incidence light to the liquid crystal panel on the other side, the incidence light and the reflective light of the two liquid crystal panels compensate mutually to improve light utilization efficiency significantly and brightness of the two liquid crystal panels, and brightness of the two can be unified simultaneously; moreover, the built-in metal wire grating polarized film substitutes the polarized plate attached on outside of the substrate, which can reduce processes and costs without sacrificing characteristics of polarized light; white backlight is formed by the blue LED, the red and green quantum dots to increase color gamut and brightness of the double-side display device.

It is comprehensible that above are merely embodiments of the disclosure, which do not limit the scope of the disclosure, any modifications, equivalent replacements or improvements within the spirit and principles of the embodiments described above should be covered by the protected scope of the disclosure.

What is claimed is:

1. A double-side liquid crystal display device, comprising:
a light guide plate, comprising at least a light incidence surface, a first light-emitting surface and a second light-emitting surface connected to the at least one light incidence surface respectively and disposed opposite;
a light source, disposed adjacently to the light incidence surface, the light source comprising a blue LED, red light quantum dots and green light quantum dots, light from the blue LED, light from the red light quantum dots and light from the green light quantum dots blended to form white light;
a first liquid crystal panel, disposed adjacently to the first light-emitting surface, the first liquid crystal panel comprising a first substrate, a second substrate and a first liquid crystal layer disposed between the first substrate and the second substrate, the first substrate being farther away from the first light-emitting surface than the second substrate being, and a first metal wire grating polarized film of the first liquid crystal panel being contacted with the second substrate;
a second liquid crystal panel, disposed adjacently to the second light-emitting surface, a second metal wire grating polarized film of the second liquid crystal panel being adjacent to the second light-emitting surface;
a first diffusion plate and a second diffusion plate, the first diffusion plate being disposed between the light guide plate and the first metal wire grating polarized film, the second diffusion plate being disposed between the light guide plate and the second metal wire grating polarized film;
wherein a direction of a metal wire grating of the first metal wire grating polarized film is perpendicular to that of the second metal wire grating polarized film.

2. The double-side liquid crystal display device according to claim 1, wherein the red light quantum dots and the green light quantum dots are dispersed in a first quantum dot film and a second quantum dot film, the first quantum dot film and the second quantum dot film are disposed on the first light-emitting surface and second light-emitting surface of the light guide plate.

3. The double-side liquid crystal display device according to claim 1, wherein the red light quantum dots and the green light quantum dots are dispersed in one quantum dot film, the quantum dot film is disposed on the first light-emitting surface and second light-emitting surface of the light guide plate.

4. The double-side liquid crystal display device according to claim 1, wherein the second liquid crystal panel further comprises a third substrate, a fourth substrate and a second liquid crystal layer disposed between the third substrate and the fourth substrate, the third substrate being farther away from the second light-emitting surface than the fourth substrate being, the second metal wire grating polarized film being contacted with the second substrate.

5. A double-side liquid crystal display device, comprising:
a light guide plate, comprising at least a light incidence surface, a first light-emitting surface and a second light-emitting surface connected to the at least one light incidence surface respectively and disposed opposite;
a light source, disposed adjacently to the light incidence surface;
a first liquid crystal panel, disposed adjacently to the first light-emitting surface, the first liquid crystal panel comprising a first substrate, a second substrate and a first liquid crystal layer disposed between the first substrate and the second substrate, the first substrate being farther away from the first light-emitting surface than the second substrate being, and a first metal wire grating polarized film of the first liquid crystal panel being contacted with the second substrate;
a second liquid crystal panel, disposed adjacently to the second light-emitting surface, a second metal wire grating polarized film of the second liquid crystal panel being adjacent to the second light-emitting surface;
wherein a direction of a metal wire grating of the first metal wire grating polarized film is perpendicular to that of the second metal wire grating polarized film.

6. The double-side liquid crystal display device according to claim 5, wherein the light source comprises a blue LED, red light quantum dots and green light quantum dots, light from the blue LED, light from the red light quantum dots and light from the green light quantum dots are blended to form white light.

7. The double-side liquid crystal display device according to claim 6, wherein the red light quantum dots and the green light quantum dots are dispersed in a first quantum dot film and a second quantum dot film, the first quantum dot film and the second quantum dot film are disposed on the first light-emitting surface and second light-emitting surface of the light guide plate.

8. The double-side liquid crystal display device according to claim 6, wherein the red light quantum dots and the green light quantum dots are dispersed in one quantum dot film, the quantum dot film is disposed on the first light-emitting surface and second light-emitting surface of the light guide plate.

9. The double-side liquid crystal display device according to claim 5, wherein the second liquid crystal panel further comprises a third substrate, a fourth substrate and a second liquid crystal layer disposed between the third substrate and the fourth substrate, the third substrate being farther away from the second light-emitting surface than the fourth substrate being, the second metal wire grating polarized film being contacted with the second substrate.

10. The double-side liquid crystal display device according to claim 5, wherein the double-side liquid crystal display device further comprises a first diffusion plate and a second diffusion plate, the first diffusion plate is disposed between the light guide plate and the first metal wire grating polarized film, the second diffusion plate is disposed between the light guide plate and the second metal wire grating polarized film.

* * * * *